June 9, 1925. 1,541,616
B. C. BOGGS
BRICKLAYER'S GAUGE
Filed Sept. 7, 1923    3 Sheets-Sheet 1
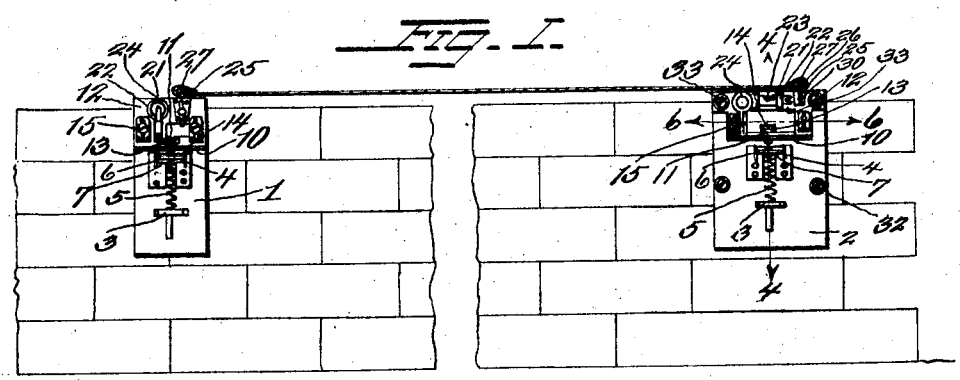
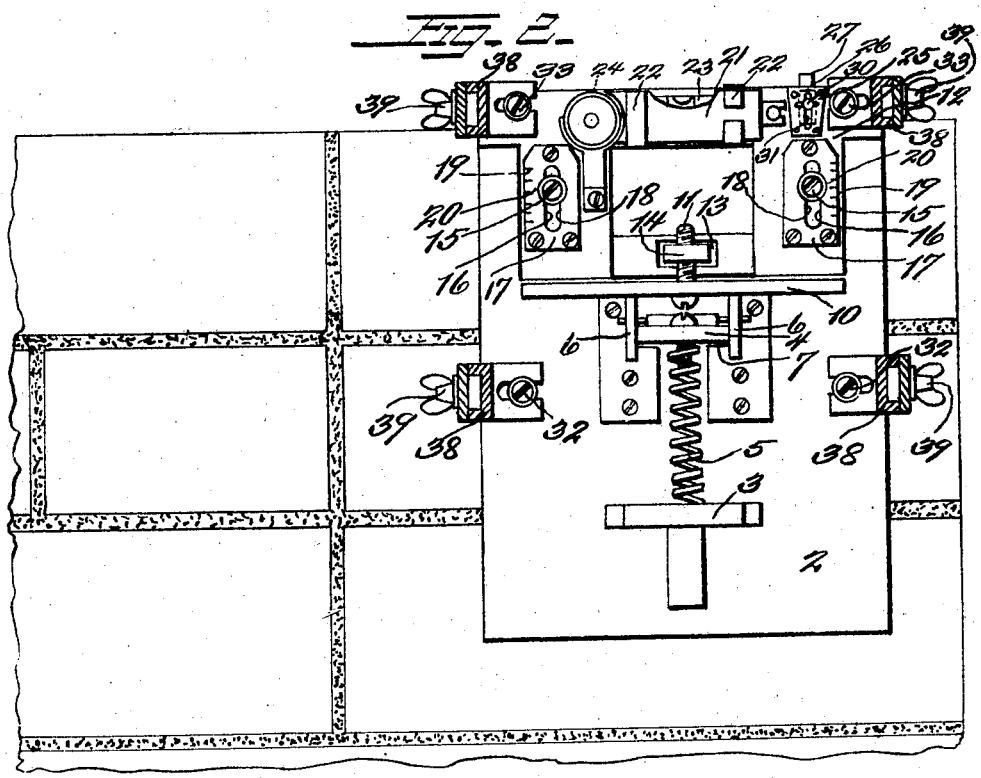
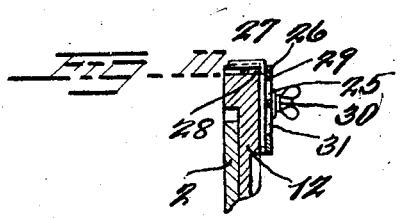
Inventor
B. C. Boggs

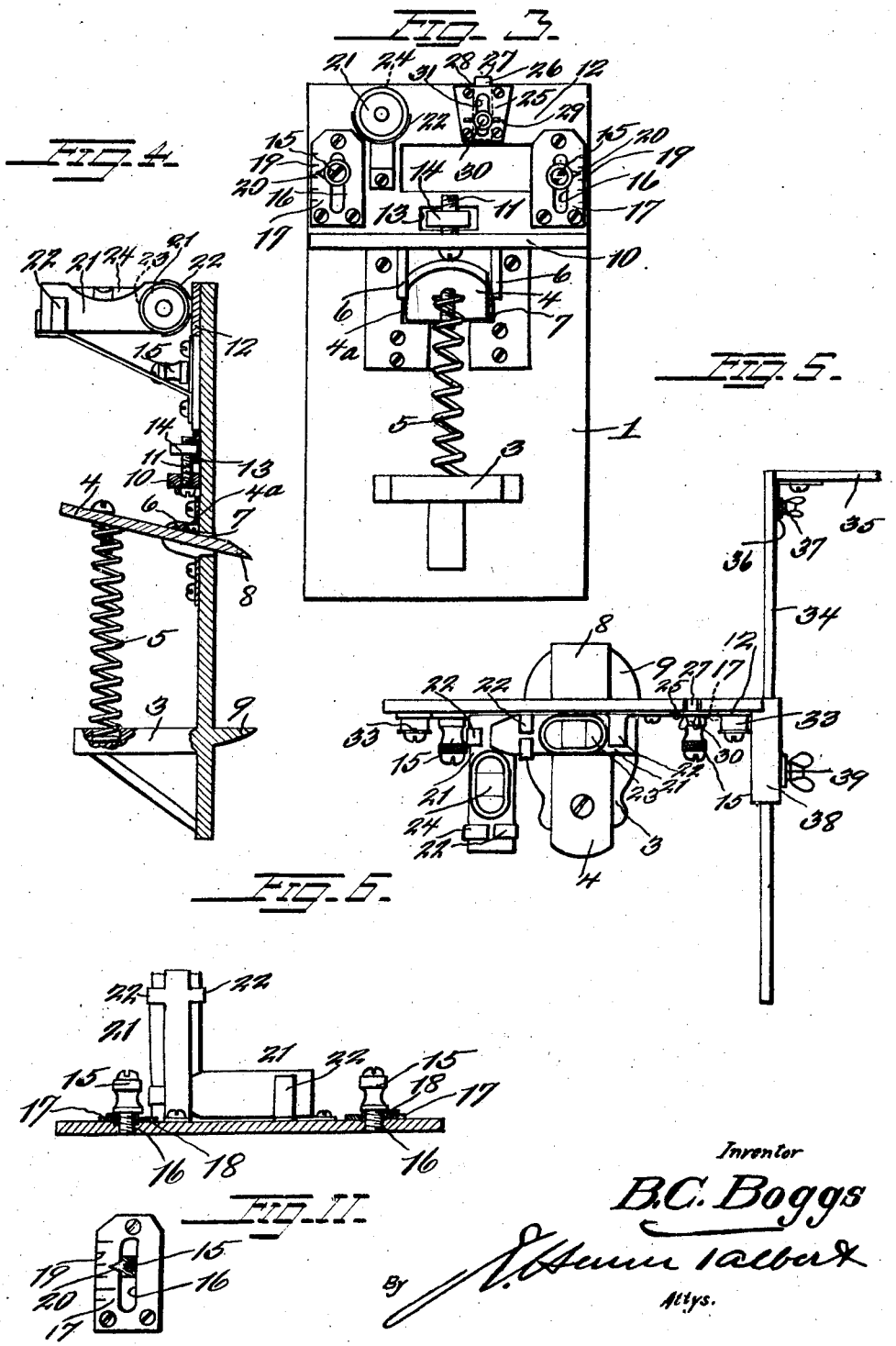

June 9, 1925.
B. C. BOGGS
BRICKLAYER'S GAUGE
Filed Sept. 7, 1923
1,541,616
3 Sheets-Sheet 3
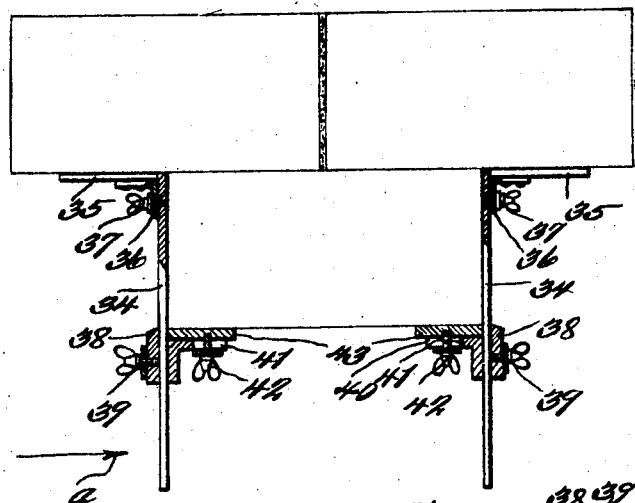
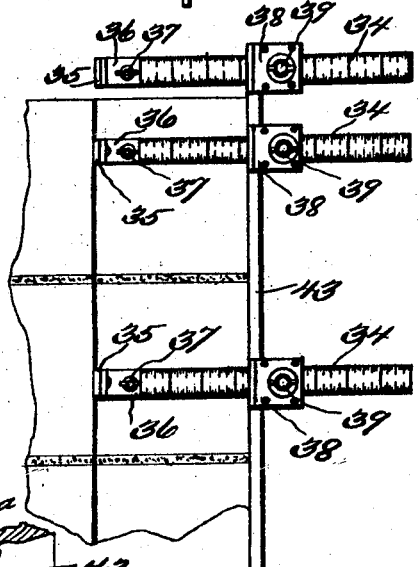
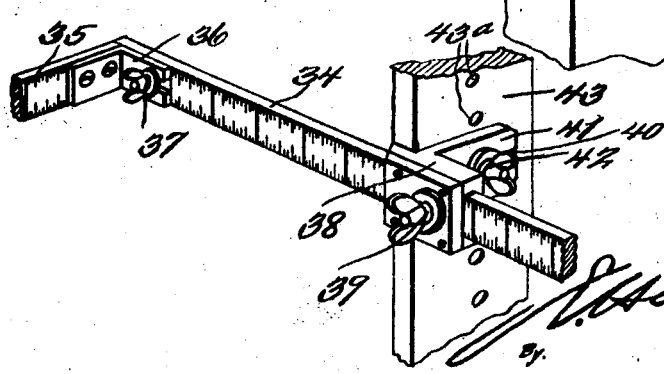
Inventor
B.C. Boggs Patented June 9, 1925.

1,541,616

UNITED STATES PATENT OFFICE.

BENJAMIN C. BOGGS, OF EAST LAKE, ALABAMA.

BRICKLAYER'S GAUGE.

Application filed September 7, 1923. Serial No. 661,476.

*To all whom it may concern:*

Be it known that I, BENJAMIN C. BOGGS, a citizen of the United States, residing at East Lake, in the county of Jefferson and State of Alabama, have invented new and useful Improvements in Bricklayers' Gauges, of which the following is a specification.

In a device of the above character, the invention aims to provide a construction including spirit levels, height gauges and supporting means therefor to hold the various parts in position in order to more accurately construct a wall.

The invention further aims to provide a construction of device by which the perpendicularity and the level of the wall are assured.

A still further purpose is the provision of means for supporting the bricklayer's gauge on the side of a wall, in combination with means for connecting two similar gauges so as to hold a mason's or bricklayer's line horizontally.

The invention comprises further features and combinations of parts to be hereinafter set forth, shown in the drawings and claimed.

In the drawings:

Figure 1 is a view in elevation of a portion of a wall, preferably made up of bricks, showing two bricklayers' gauges supported thereon and holding a mason's or bricklayer's gauge line.

Figure 2 is an enlarged view in elevation of the gauge shown on the right in Figure 1.

Figure 3 is an enlarged view in elevation of the gauge shown on the left in Figure 1.

Figure 4 is a vertical sectional view on line 4—4 of Figure 1.

Figure 5 is a plan view of the bricklayer's gauge shown on the right in Figure 1, illustrating one of the rule gauges.

Figure 6 is a sectionl view on line 6—6 of Figure 1.

Figure 7 is a plan view showing the use of the rule gauges.

Figure 8 is a view in elevation at right angles to Figure 7 looking in the direction of the arrow *a*.

Figure 9 is a detail perspective view of one of the rule gauges shown in Figures 7 and 8.

Figure 10 is a detail vertical sectional view through the mason's line clamp 25.

Figure 11 is a horizontal detail sectional view of the mounting of the set-screw 15 and one of the pointers 20.

Referring to the drawings, 1 and 2 designate the supporting plates of the bricklayers' gauges. Both gauges are of similar construction and design, in general, with the exception that one is much broader than the other and includes wall gauging rules and means for retaining said rules on the base. The broader of the two gauges includes an additional spirit level to insure leveling the broad gauge in a direction with the wall.

The base of each gauge is provided with an outstanding lug 3 between which and a pivoted clamp 4 a spring 5 is interposed for the purpose of cooperating with the clamp to cause the same to bind against a brick for holding the gauge in position. This clamp is pivotally supported between the jaws 6 which stand outwardly from the base 2. The clamp 4 passes through an opening 7 and secured to the base 2 at a point below the end 8 of the clamp is a lug 9. The lug 9 and the end 8 of the clamp are tapered so as to gouge into the mortar between the bricks to hold the base 2 adjacent the outer surface of the wall. When mounting the base in position, the clamp 4 is pressed toward the lug 3, thereby moving the end 8 of the clamp in a direction from the lug 9 and positioning the end 8 so it will engage between the bricks. When pressure upon the lug 3 is relieved, the end 8 of the clamp will bind against the brick and draw the lug 9 against the under surface of the brick. In this way, the base of each gauge is supported firmly in position.

Outstanding from the base is a flange 10 which is provided with a screw projection 11. A slide 12 is disposed adjacent the upper portion of the outer face of the base of each gauge and normally the lower edge of the slide rests upon the flange 10. A transverse portion of the slide 12 has a depression or slot 13 which partially receives a circular nut 14 which is threaded upon the screw projection 11. Obviously, by rotating the circular nut (the outer periphery of which is knurled to facilitate its turning), the slide may be raised and lowered due to the screw projection being stationary and the nut engaging in the depression 13.

Threaded into the base adjacent its upper portion are screws 15, the shanks of which pass through elongated slots 16 of the slide.

Plates 17 are secured upon the slide 12 and have slots 18 registering with the slots in the slide. The plates 17 have graduations 19 with which the pointers 20 cooperate for indicating the adjustment of the slide. The pointers have their body portions guided in the slots 18. The body portions of the pointers have openings through which the shanks of the thumb screws pass. In fact, the bodies of the pointers engage between the body portions of the thumb screws and said plates. After the slide is once adjusted, the screws which act to guide the slide 12 are tightened to insure holding the slide in position.

By means of suitable holders 21 including clamping arms 22, spirit levels 23 and 24 are mounted upon the slide. The spirit level 23 is used for indicating whether or not the gauge is level in a direction with the wall, while the spirit level 24 is employed for indicating whether or not the wall is level in a direction transversely thereof.

The slide of each gauge has a mason's line clamp 25 which comprises the slide bar 26, the lateral arm 27 of which engages the notch 28 of the edge of the slide to hold the mason's line or cord engaged with the edge of the slide. The clamping slide of the line clamp is keyed between a plate 29 (which is secured to the slide) and one face of the slide, the securing means of the plate acting as guides for the opposite edge of the clamping slide. A suitable thumb screw 30 is threaded to the clamping slide and has its shank engaging through an elongated slot 31 of said plate so as to hold the clamping slide in its clamping position. The mason's line or cord is engaged under the lateral arm of one gauge and similarly connected to the edge of the slide of the opposite gauge. The two gauges are set, as shown in Figure 1, and after the slides 12 are adjusted to their proper height to level the gauges longitudinally and transversely with the wall, the mason's line will then be in a position to gauge the proper level of the bricks as they are laid.

The slide 12 of the gauge which includes the base 1 has only one spirit level which indicates whether or not the wall is level in a direction transversely thereof. The gauge which includes the base 2 has screws 32 threaded thereto which clamp a rule gauge in position on the base. The upper portion of the slide 12 of one of the bricklayers' gauges is provided with screws 33 either one of which may clamp a rule gauge to the slide. Each rule gauge comprises long and short legs 34 and 35, the latter extending laterally to the former. The latter leg 35 is detachable due to it including a slotted extension arm 36 which engages under the head of the securing screw 37. The lower rule gauge has its arm extending out from one end of the wall while the short arm of the upper rule gauge extends in a direction with and above the wall.

The rule gauges each include a holder 38 having an opening or passage therethrough for the reception of either arm of the rule gauge, there being a set-screw 39 for securing the holder in different adjusted positions on the rule. Each holder has an integral extension plate 41 which is slotted at 40 to receive a set-screw 42 by which the extension plate 41 may be secured in any one of the depressions or countersinks 43$^a$ of the face plate 43, as shown in Figures 7 and 9. These rule gauges are used for gauging the laying of bricks in the construction of a pilaster, as shown in Figures 7 and 8. In this application of the rule gauges, the face plates lie against the brick pilaster. However, the slotted extension plate 41 may engage with the shank of either set-screw 33. In fact, the plate may engage between the head of the screw and one face of the slide 12, as in Figure 5. The rule gauge in this instance gauges the laying of the bricks at the corner of a wall. The long and short arms of the rule gauges are graduated, preferably in inches, on their opposite faces.

As shown in Figure 2, rule gauges including holders 38 may be secured to the supporting or face plate 2 by means of the screws 32 and 33. The screws 33 are carried by the slide 12 while the screws 32 are carried by the plate 2. In this way, the holders 38 (which may carry the long leg rules 34) of the rule gauges are secured under the screws 33, hence are movable with the slide 12. The holders 38 of the rule gauges which are secured in place by the screws 32 are carried by the plate 2.

It will be noted that the rules 34 have their longitudinal upper edges flush or level with the top edge of the plate 2 as this gives the level line for laying a top layer of bricks. It will also be noted that the holders 38 are constructed so as not to protrude beyond one face of the plate 2, when used as in Figure 2, or beyond one face of the face plate 43, so that when the plate 2 is used as in Figure 2, it may lie flat against the wall and when the face plate 43 is used in a similar manner to that of the plate 2 in Figure 2, the face plate 43 may lie flat against the wall provided the rule 34 is removed.

The invention having been set forth, what is claimed is:

1. A bricklayer's gauge including a support, means for clamping the support on a brick in the wall, and a slide adjustably mounted upon the support and provided with means for leveling it in a direction longitudinally with and transversely of the wall.

2. A bricklayer's gauge including a support, means for clamping the support on a